(12) United States Patent
Yang et al.

(10) Patent No.: US 11,453,772 B2
(45) Date of Patent: Sep. 27, 2022

(54) POLYMER COMPOSITIONS BASED ON PXE (71) Applicant: Robert Bosch GmbH, Stuttgart (DE)

(72) Inventors: Jin Yang, Pleasanton, CA (US); Jonathan C. Pistorino, Oakland, CA (US); Hany Basam Eitouni, Oakland, CA (US)

(73) Assignee: Robert Bosch GmbH, Stuttgart (DE)

( * ) Notice: Subject to any disclaimer, the term of this patent is extended or adjusted under 35 U.S.C. 154(b) by 478 days.

(21) Appl. No.: 16/224,736

(22) Filed: Dec. 18, 2018

(65) Prior Publication Data

US 2020/0102451 A1 Apr. 2, 2020

Related U.S. Application Data (63) Continuation of application No. PCT/US2018/066330, filed on Dec. 18, 2018.

(60) Provisional application No. 62/739,336, filed on Sep. 30, 2018.

(51) Int. Cl.
*H01M 10/052* (2010.01)
*C08L 53/00* (2006.01)
*C08L 71/12* (2006.01)
*C08L 67/00* (2006.01)
*H01M 10/0565* (2010.01)
(Continued)

(52) U.S. Cl.
CPC ............ *C08L 53/00* (2013.01); *C08L 67/00* (2013.01); *C08L 71/126* (2013.01); *H01M 10/052* (2013.01); *H01M 10/0565* (2013.01); *C08L 81/02* (2013.01); *H01M 4/131* (2013.01); *H01M 2300/0082* (2013.01)

(58) Field of Classification Search
None
See application file for complete search history.

(56) References Cited

U.S. PATENT DOCUMENTS

| 2,697,104 | A | 12/1954 | Lowe |
| 3,578,568 | A | 5/1971 | Washall |
| 3,745,092 | A | 7/1973 | Vanderwater |

(Continued)

FOREIGN PATENT DOCUMENTS

| CN | 103003356 A | 3/2013 |
| EP | 0781795 B1 | 10/2003 |

OTHER PUBLICATIONS

Albertsson, "Degradable high-molecular-weight random copolymers, based on e-caprolactone and 1,5-dioxepan-2-one, with non-crystallizable units inserted in the crystalline structure," Polymer vol. 36 No. 5, pp. 1009-1016, 1995.

(Continued)

*Primary Examiner* — Victoria H Lynch
(74) *Attorney, Agent, or Firm* — Brooks Kushman P.C.

(57) ABSTRACT

New polymer compositions based on poly(2,6-dimethyl-1,4-phenylene oxide) and other high-softening-temperature polymers are disclosed. These materials have a microphase domain structure that has an ionically-conductive phase and a phase with good mechanical strength and a high softening temperature. In some arrangements, the structural block has a softening temperature of about 210° C. These materials can be made with either homopolymers or with block copolymers. When these polymers are combined with electrolyte salts, they can be used as electrolytes that have both high ionic conductivity and good mechanical properties.

10 Claims, 6 Drawing Sheets

(51) Int. Cl.
*C08L 81/02* (2006.01)
*H01M 4/131* (2010.01)

(56) References Cited

U.S. PATENT DOCUMENTS

| | | | |
|---|---|---|---|
| 3,987,065 | A | 10/1976 | Dennis |
| 4,033,617 | A | 7/1977 | Cocuzza |
| 4,778,567 | A | 10/1988 | Kakimoto |
| 5,006,206 | A | 4/1991 | Shih |
| 5,107,022 | A | 4/1992 | de Besset |
| 5,290,405 | A | 3/1994 | Joshi et al. |
| 5,340,446 | A | 8/1994 | Nelson |
| 5,354,430 | A | 10/1994 | Culbreth et al. |
| 5,475,054 | A | 12/1995 | Abe et al. |
| 5,489,366 | A | 2/1996 | Jongenburger |
| 6,274,277 | B1 | 8/2001 | Mori et al. |
| 6,645,675 | B1 | 11/2003 | Munshi |
| 7,541,417 | B2 | 6/2009 | Ashtekar et al. |
| 9,133,338 | B2 | 9/2015 | Yang et al. |
| 9,590,268 | B2 | 3/2017 | Yang et al. |
| 9,923,231 | B2 | 3/2018 | Geier et al. |
| 10,000,606 | B2 | 6/2018 | Yang et al. |
| 2003/0031933 | A1 | 2/2003 | Shembel et al. |
| 2003/0222048 | A1 | 12/2003 | Asakawa et al. |
| 2005/0058881 | A1 | 3/2005 | Goebel et al. |
| 2005/0109502 | A1 | 5/2005 | Slay et al. |
| 2005/0175894 | A1 | 8/2005 | Visco et al. |
| 2005/0256256 | A1 | 11/2005 | Muramoto et al. |
| 2006/0000392 | A1 | 1/2006 | Reisacher et al. |
| 2006/0063065 | A1 | 3/2006 | Clarke et al. |
| 2007/0172739 | A1 | 7/2007 | Visco et al. |
| 2008/0213672 | A1 | 9/2008 | Skotheim et al. |
| 2009/0030102 | A1 | 1/2009 | Nelles et al. |
| 2009/0075176 | A1 | 3/2009 | Singh et al. |
| 2010/0035113 | A1 | 2/2010 | Nodono |
| 2013/0063092 | A1 | 3/2013 | Yang et al. |
| 2016/0017101 | A1* | 1/2016 | Mather ............. C08G 81/021 525/57 |
| 2016/0336620 | A1* | 11/2016 | Yang ............. H01M 10/0565 |
| 2017/0092983 | A1 | 3/2017 | Pratt et al. |
| 2017/0346129 | A1* | 11/2017 | Stolyarov ............. H01M 4/622 |
| 2018/0375153 | A1* | 12/2018 | Yang ............. C07F 5/022 |

OTHER PUBLICATIONS

Bhaw-Luximon, "Polymerization of e-Caprolactone and its Copolymerization with g-Butyrolactone using Metal Complexes," Macromol. Symp. 2006, 231, 60-68.

Degirmenci, "Synthesis and Characterization of Cyclohexene Oxide Functional Poly(e-caprolactone) Macromonomers and Their Use in Photoinitiated Cationic Homo- and Copolymerization," J. Polym. Sci. Part A: Polym. Chem.: vol. 42 (2004) p. 3365.

Degirmenci, "Synthesis and Characterization of Macrophotoinitiators of Poly(e-caprolactone) and Their Use in Block Copolymerization," Macromolecules 2002, 35, 8265-8270.

Helwig, "Ring-opening polymerization of lactones in the presence of hydroxyapatite," Biomaterials 22 (2001) 2695} 2702.

International Preliminary Report on Patentability, International application No. PCT!US2011!037071, dated Nov. 20, 2012.

International Search Report for PCT/US10/45540 dated Oct. 7, 2010.

J. F. Hester, P. Banerjee, Y.-Y. Won, A. Akthakul, M. H. Acar, and A. M. Mayes, "ATRP of Amphiphilic Graft Copolymers Based on PVDF and Their Use as Membrane Additives," Macromolecules 2002, 35, 7652-7661.

Kanehira Nakamura, Ryuichi Endo, and Masatami Takeda "Solution Behavior of Styrene-Ethylene Oxide Block Copolymers," Journal of Polymer Science, Polymer Physics Edition vol. 14, 135-142 (1976).

Kiskan, "Synthesis and characterization of naphthoxazine functional poly(e-caprolactone)," Polymer 46 (2005) 11690-11697.

Labet, "Synthesis of polycaprolactone: a review", Chem. Soc. Rev., 2009, 38, 3484-3504.

Nikos Hadjichristidis, Herm Iatrou, Stergios Pispas, Marinos Pitsikalis, "Anionic Polymerization: High Vacuum Techniques," Journal of Polymer Science: Part A: Polymer Chemistry, vol. 38, 3211-3234 (2000).

Application PCT/US2018/066330 International Search Report dated Apr. 19, 2019.

* cited by examiner

POLYMER COMPOSITIONS BASED ON PXE

This application is a Continuation of International Application No. PCT/US 18/66330, filed Dec. 18, 2018, which, in turn, claims priority to U.S. Provisional Patent Application 62/739,336, filed Sep. 30, 2018, both of which are incorporated by reference herein.

BACKGROUND OF THE INVENTION

Field of the Invention

This invention relates generally to a newly-synthesized microphase-separated polymer material.

All publications referred to herein are incorporated by reference in their entirety for all purposes as if fully set forth herein.

The increased demand for lithium secondary batteries has resulted in research and development to improve their safety and performance. Many batteries employ liquid electrolytes and are associated with high degrees of volatility, flammability, and chemical reactivity. With this in mind, the idea of using a solid electrolyte with a lithium-based battery system has attracted great interest.

The lithium solid polymer electrolyte rechargeable battery is an especially attractive technology for Li-ion batteries because, among other benefits, the solid polymer electrolyte exhibits high thermal stability, low rates of self-discharge, stable operation over a wide range of environmental conditions, enhanced safety, flexibility in battery configuration, minimal environmental impacts, and low materials and processing costs. Moreover, solid polymer electrolytes may enable the use of lithium metal anodes, which offer higher energy densities than traditional lithium ion anodes.

Despite their many advantages, the adoption of solid polymer electrolytes has been curbed by the inability to develop an electrolyte that exhibits both high ionic conductivity and good mechanical properties. This difficulty arises because high ionic conductivity, according to standard mechanisms, calls for high polymer chain mobility. But high polymer chain mobility, according to standard mechanisms, tends to produce mechanically soft polymers.

As an example, a prototypical polymer electrolyte is one composed of polyethylene oxide (PEO)/salt mixtures. PEO generally offers good mechanical properties at room temperature. However, PEO is also largely crystalline at room temperature. The crystalline structure generally restricts chain mobility, reducing conductivity. Operating PEO electrolytes at high temperature (i.e., above the polymer's melting point) solves the conductivity problem by increasing chain mobility and hence improving ionic conductivity. However, the increased conductivity comes at a cost in terms of deterioration of the material's mechanical properties. At higher temperatures, the polymer is no longer rigid.

Block copolymers have been proposed as materials that may be able to exhibit both good mechanical properties and good conductivity. By using microphase separated block copolymers of two or more blocks, at least one block can impart mechanical integrity while at least one block can impart high conductivity. Polymer electrolytes are plagued by poor conductivity compared to liquid electrolytes. Polymer electrolytes conduct better at higher temperatures, and operating electrochemical cells at very high temperatures greater than 110° C. results in conductivities similar to liquid electrolytes at room temperature. This must be balanced, however, against the melting temperature of the mechanical blocks. Thus far, no block copolymer has been reported that can be operated at high temperatures (e.g., greater than 150° C.) while maintaining high mechanical strength.

Therefore, there has been and is still a strong need for a polymeric electrolyte material with sufficient practical ionic conductivity and mechanical stability at high temperature operation.

SUMMARY

Several new polyester-based polymers are disclosed. Any of the polymers disclosed herein can be combined with an electrolyte salt, such as a lithium salt and used as an electrolyte in an electrochemical cell.

In one embodiment of the invention, a new polyester-based polymer has the following structure:

in which Ar can be any of:

Y can be any of ketones, sulfones, isopropylidene, hexafluoroisopropylidene, amides, oxygen, sulfur, nitrogen, or phosphonate; $R_1$, $R_2$, $R_3$, and $R_4$ are selected independently of one another and can be any of hydrogen, alkyl, halogenated alkyl, alkene, aromatic rings, siloxane, alkyl ether, or alkyl thioether; $R_6$ can be any of alkyl, halogenated alkyl, alkene, aromatic rings, siloxane, alkyl ether, or alkyl thioether; a is an integer ranging from 10 to 90; and b is an integer ranging from 10 to 90. This polymer can be combined with an electrolyte salt, such as a lithium salt and used as an electrolyte in an electrochemical cell.

In one arrangement, there is an additional group attached to the polyester-based polymer shown above, and together they form a triblock copolymer. The additional group is:

and the triblock copolymer has the following structure:

in which c is an integer ranging from 10 to 90.

In another arrangement, there is a different additional group attached to the polyester-based polymer shown above, and together they form a triblock copolymer. The additional group is:

and the triblock copolymer has the following structure:

in which d is an integer ranging from 10 to 90.

In another embodiment of the invention, an electrolyte, includes an association of a plurality of block copolymer chains wherein each includes 1) at least one ionically conducting block comprising polyester and an electrolyte salt and 2) at least one poly(2,6-dimethyl-1,4-phenylene oxide) block immiscible with the ionically conducting block. The block copolymer chains are arranged in an ordered nanostructure comprising a continuous matrix of 1) first domains defined by an association of the ionically-conductive block(s) and 2) second domains defined by an association of poly(2,6-dimethyl-1,4-phenylene oxide) block(s).

In another embodiment of the invention a polymer composition includes an ordered nanostructure comprising a matrix of first domains defined by association of first polymers, the first polymers comprising polyester; and second domains defined by association of second polymers. The second domains have a softening temperature no less than 190° C. In some arrangements, the first polymers and the second polymers form block copolymers, each block copolymer comprising a first polymer as a first block and a second polymer as a second block. In some arrangements, the first blocks comprise comb polymers that have a backbone and pendant groups. The backbones may be any of polysiloxanes, polyphosphazines, polyethers, polyesters, polydienes, polyolefins, polyacrylates, polymethacrylates, or combinations thereof. The pendants may be any of oligoethers, substituted oligoethers, nitrile groups, sulfones, thiols, polyethers, polyesters, polyamines, polyimides, polyamides, alkyl carbonates, polynitriles, other polar groups, or combinations thereof. In some arrangements, the second blocks are any of poly(phenylene oxide), poly(2,6-dimethyl-1,4-phenylene oxide) (PXE), poly(phenylene sulfide), poly(phenylene sulfide sulfone), poly(phenylene sulfide ketone), poly(phenylene sulfide amide), or polysulfone.

In some embodiments of the invention, an electrolyte includes an ionically-conductive phase comprising polyester and an electrolyte salt; and a structural phase wherein the structural phase has a softening temperature no less than 190° C. The two phases form a microphase separated domain structure. In some arrangements, the structural phase includes PXE. In some arrangements, the ionically-conductive phase and the structural phase form block copolymers, wherein an association of first blocks forms the ionically-conductive phase and an association of second blocks forms the structural phase.

In another embodiment of the invention, a method of synthesizing a poly(2,6-dimethyl-1,4-phenylene oxide)-polycaprolactone block copolymer is disclosed. The method involves the steps of: dissolving poly(2,6-dimethyl-1,4-phenylene oxide) in anhydrous toluene to form a first solution; adding tin(II) 2-ethylhexanoate and ε-caprolactone to the first solution to form a second solution; heating the second solution to 120° C. and holding for 5 days; and precipitating the second solution into MeOH to form a solid precipitate of poly(2,6-dimethyl-1,4-phenylene oxide)-polycaprolactone block copolymer.

In another embodiment of the invention, an electrochemical cell is disclosed. The cell includes an anode configured to absorb and release lithium ions; a cathode comprising cathode active material particles, an electronically-conductive additive, and a catholyte; a current collector adjacent to an outside surface of the cathode; and a separator region between the anode and the cathode, the separator region comprising a separator electrolyte configured to facilitate movement of lithium ions back and forth between the anode and the cathode. The separator electrolyte may be any of the electrolytes disclosed herein. In some arrangements, the separator electrolyte includes a lithium salt. The catholyte may be a solid polymer electrolyte. The catholyte may be immiscible with the separator electrolyte. The catholyte and the separator electrolyte may be the same. The anode may be any of lithium metal, lithium alloy, lithium titanate, graphite or silicon. The cathode active material may be any of lithium iron phosphate, lithium metal phosphate, divanadium pentoxide, lithium nickel cobalt aluminum oxide, lithium nickel cobalt manganese oxide, magnesium-rich lithium nickel cobalt manganese oxide, lithium manganese spinel, lithium nickel manganese spinel, or combinations thereof. The separator electrolyte further may also include ceramic electrolyte particles. In some arrangements, the separator electrolyte is crosslinked.

DETAILED DESCRIPTION

Disclosed herein are new microphase domain polymer materials with high softening temperatures. The polymers have ionically-conductive polymer domains and structural polymer domains that have higher softening temperatures ($T_s$) than have been possible before in ionically-conductive polymers. In some embodiments of the invention, the microphase domain polymer material has domains made up of ionically-conducive homopolymers and domains made of structural homopolymers with high softening temperatures ($T_s$). The ionically-conductive polymers and the structural polymers self-order and microphase separate. In some embodiments of the invention, the microphase domain polymer material is a block copolymer that has an ionically-conductive polymer block and a structural polymer block that has a high softening temperature ($T_s$). The microphase domain polymer materials can be combined with electrolyte salts (such as lithium salts) to create ionically-conductive materials that are solid at desirable high operating temperatures for use in batteries and the like.

For the purposes of this disclosure, the term "softening temperature ($T_s$)" is used to mean either glass transition temperature (for glassy polymers) or melting temperature (for crystalline polymers). There are glassy polymers in many embodiments, so the term "glass transition temperature ($T_g$)" is used. It should be understood that for embodiments where crystalline polymers are used, the term "melting temperature ($T_m$)" can be substituted for $T_g$.

Any of the polymers disclosed herein can be used as electrolytes in lithium battery cells when combined with lithium-based electrolyte salts.

Highly conducting polymer electrolytes based on block copolymers of polystyrene (PS) and polyethylene oxide (PEO) have been disclosed previously, for example, in U.S. Pat. No. 8,563,168, issued Oct. 22, 2013, U.S. Pat. No. 8,268,197, issued Sep. 18, 2012, and U.S. Pat. No. 8,889,301, issued Nov. 18, 2014, all of which are included by reference herein. The approximate chemical structures of these polymers are shown as (1) below, wherein m and n are the numbers of repeat units for the polystyrene and polyethylene oxide blocks, respectively.

(1)

Such block copolymers have a unique lamella microphase domain morphology that results in both high modulus and relatively high ionic conductivity at 80° C. However, such polymers cannot operate at temperatures higher than about 90° C. or 100° C., where the PEO would have even higher conductivity.

Example of structural blocks that have been used in such block copolymers polymers include, but are not limited to, polystyrene, hydrogenated polystyrene, polymethacrylate, poly(methyl methacrylate), polyvinylpyridine, polyvinylcyclohexane, polypropylene, polyolefins, poly(t-butyl vinyl ether), poly(cyclohexyl methacrylate), poly(cyclohexyl vinyl ether), polyethylene, fluorocarbons, such as polyvinylidene fluoride, or copolymers that contain styrene, methacrylate, or vinylpyridine. In general these materials have softening temperatures that are no higher than about 180° C.

| Softening Temperatures for Some Exemplary Low $T_s$ Polymers | |
|---|---|
| Polymer | $T_s$ (° C.) |
| polystyrene | 95 |
| hydrogenated polystyrene | 146 |
| Polymethacrylates | 75 |
| poly(methyl methacrylate) | 114 |
| polyvinylpyridine | 110-180 |
| polyvinylcyclohexane | 146 |
| polypropylene | 173 |
| poly(t-butyl vinyl ether) | 74 |
| poly(cyclohexyl methacrylate) | 104 |
| poly(cyclohexyl vinyl ether) | 61 |
| polyethylene | 100 |
| polyvinylidene fluoride | 160 |

In general, it would be useful to have solid polymer electrolytes that can operate at temperatures where they are most conductive without losing their structural integrity. In some embodiments of the invention, a matrix of microphase separated solid polymers has both conductive phases and mechanically hard phases that can operate at high temperatures and still maintain their mechanical properties. For example, poly(2,6-dimethyl-1,4-phenylene oxide) (PXE) is a well-known thermoplastic polymer with a very high $T_g$ (210° C.). Thus ionically-conductive polymer materials in which PXE is a major component can operate at temperatures up to 210° C. without softening. Because the $T_g$ of the polymer material is higher than, for example, the melting point of lithium metal (180° C.), it can maintain its mechanical integrity even when used as an electrolyte in a lithium cell that experiences thermal runaway reaction and melting of the lithium anode. Additionally, PXE has excellent properties such as high toughness, high dimensional stability, good flame retardation and low moisture uptake that make it an ideal mechanical block for a microphase separated polymer electrolyte.

In an exemplary embodiment, block copolymers of PXE, the diblock PXE-PEO and the triblock PXE-PEO-PXE, can operate as electrolytes (with an added electrolyte salt) at elevated temperatures, resulting in higher ionic conductivity and longer cell cycling lifespan than is possible for the block copolymers shown in (1). The block polymer PXE-b-PEO has not been reported before. This is the first time that block polymer PXE-b-PEO has been synthesized using commercially-available PXE and metal free anionic polymerization. In some embodiments of the invention, the structure of a PXE-PEO diblock polymer is given as (2) and the structure of a PXE-PEO-PXE triblock polymer is given as (3) below.

In some arrangements, a is an integer ranging from about 10 to 90, and b is an integer ranging from about 10 to 90, and c is an integer ranging from about 10 to 90. In some arrangements, $R_1$, $R_2$, $R_3$, and $R_4$ is each chosen independently and can be any of hydrogen, alkyl, halogenated alkyl, alkene, aromatic rings, siloxane, alkyl ether, and alkyl thioether. $R_5$ can be any of hydrogen, alkyl, halogenated alkyl, alkene, an aromatic ring, siloxane, alkyl ether, and alkyl thioether. In some arrangements, $R_1$ and $R_2$ are hydrogen, $R_3$ and $R_4$ are $CH_3$, and $R_5$ is $CH_3O(CH_2CH_2O)_3 C_3H_6Si(CH_3)_2OSi(CH_3)_2C_3H_6OCH_2$.

In some embodiments of the invention, each block in any of the linear block copolymers (2) and (3) is a linear polymer. In some embodiments of the invention, at least one of the blocks in any of the block copolymers (2) and (3) is not a linear polymer. In some arrangements, at least one of the blocks in any of the block copolymers (2) and (3) is a comb or branched polymer.

Figure 1:
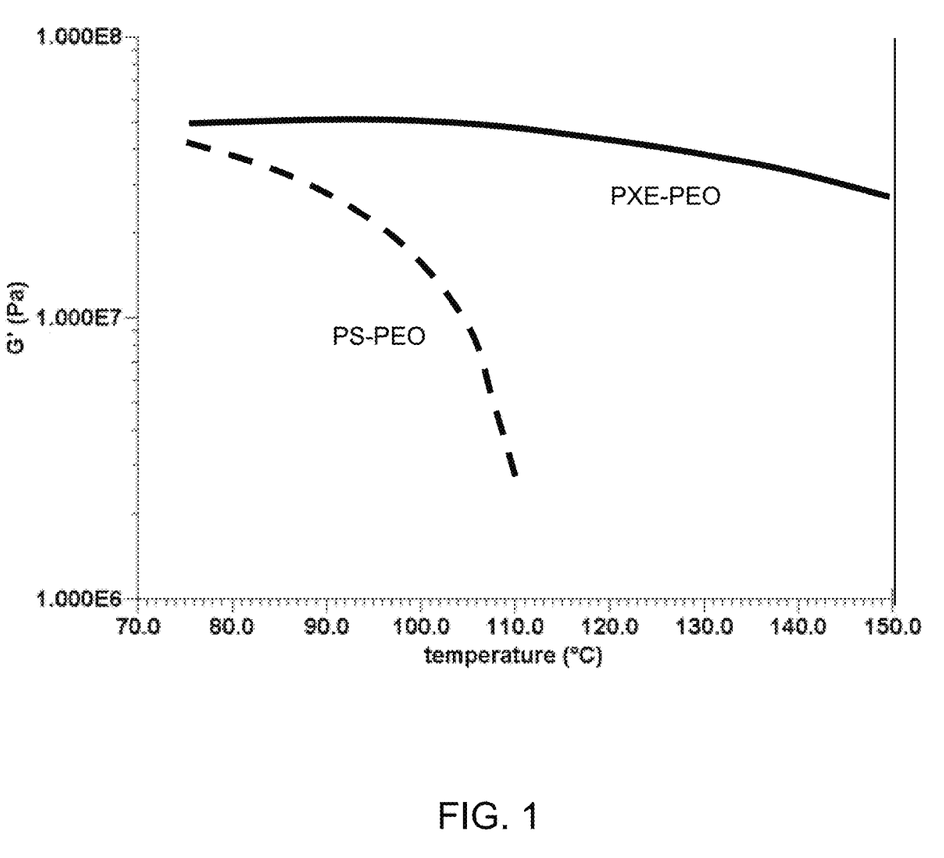
FIG. 1 shows modulus measurements for a PS-PEO block copolymer and an exemplary PXE-PEO block copolymer as a function of temperature.

FIG. 1 shows modulus measurements for a PS-PEO block copolymer and an exemplary PXE-PEO block copolymer as a function of temperature. The modulus of the PS-PEO sample drops dramatically at around 100° C. while the PXE-PEO sample retains much of its rigidity even at temperatures above 150° C.

The embodiments of the invention are not limited to the examples shown in (2)-(3) above. There are a number of structural, high $T_s$ polymers that can be substituted for PXE above. There are also a number of conductive polymers that can be substituted for the PEO above. A generalized diblock structure can be shown as:

and a generalized triblock structure can be shown as:

Ar can be any of:

Y can be any of ketones, sulfones, isopropylidene, hexafluoroisopropylidene, amides and oxygen. $R_1$, $R_2$, $R_3$, $R_4$, and $R_5$ is each chosen independently and can be any of hydrogen, alkyl, halogenated alkyl, alkene, aromatic rings, siloxane, alkyl ether, and alkyl thioether; n is an integer ranging from 1 to 10; a is an integer ranging from about 10 to 90; b is an integer ranging from about 10 to 90; and c is an integer ranging from about 10 to 90. Although these generalized structures have been shown here as block copolymers, this is not the only possibility. The conductive molecules and structural molecules can also each be homopolymers as long as they can self-assemble into a microphase domain structure.

In an exemplary embodiment, block copolymers of PXE can be made with polyesters. The diblock PXE-polyester and the triblock PXE-polyester-PXE, can operate as electrolytes (with an added electrolyte salt) at elevated temperatures, resulting in higher ionic conductivity and longer cell cycling lifespan than is possible for the block copolymers shown in (1). The block polymer PXE-b-polyester has not been reported before. This is the first time that block polymer PXE-b-polyester has been synthesized using commercially-available PXE and coordination ring opening polymerization. In some embodiments of the invention, the structure of a PXE-polyester diblock polymer is given as (4) and the structure of a PXE-polyester-PXE triblock polymer is given as (5) below. An inverse version of a PXE-polyester-PXE triblock polymer is given as (6) below.

alkyl ether, and alkyl thioether. In some arrangements, $R_1$ and $R_2$ are hydrogen, $R_3$ and $R_4$ are $CH_3$, and $R_6$ is $C_5H_{10}$.

In some embodiments of the invention, each block in any of the linear block copolymers (4), (5), and (6) is a linear polymer. In some embodiments of the invention, at least one of the blocks in any of the block copolymers (4), (5), and (6) is not a linear polymer. In some arrangements, at least one of the blocks in any of the block copolymers (4), (5), and (6) is a comb or branched polymer.

In an exemplary embodiment in which $R_1$ and $R_2$ are methyl groups, $R_3$ and $R_4$ are hydrogen, and $R_6$ is $(CH_2)_5$, the structures shown in (4), (5), and (6) above become block copolymers of PXE and polycaprolactone (PCL). The diblock PXE-PCL and the triblock PXE-PCL-PXE, can operate as electrolytes (with an added electrolyte salt) at elevated temperatures, resulting in higher ionic conductivity and longer cell cycling lifespan than is possible for the block copolymers shown in (1). The block polymer PXE-b-PCL has not been reported before. This is the first time that block polymer PXE-b-PCL has been synthesized using commercially-available PXE and coordination ring opening polymerization. In some embodiments of the invention, the structure of a PXE-PCL diblock polymer is given as (7) and the structure of a PXE-PCL-PXE triblock polymer is given as (8) below. An inverse version of a PXE-PCL-PXE triblock polymer is given as (9) below.

In some arrangements, a is an integer ranging from 10 to 90, b is an integer ranging from 10 to 90, and c is an integer ranging from 10 to 90. In some arrangements, $R_1$, $R_2$, $R_3$, and $R_4$ is each chosen independently and can be any of hydrogen, alkyl, halogenated alkyl, alkene, aromatic rings, siloxane, alkyl ether, and alkyl thioether, and $R_6$ can be any of alkyl, halogenated alkyl, alkene, aromatic rings, siloxane, In some arrangements, a is an integer ranging from about 10 to 90, and b is an integer ranging from about 10 to 90, and c is an integer ranging from about 10 to 90.

In some embodiments of the invention, each block in any of the linear block copolymers (7), (8), and (9) is a linear polymer. In some embodiments of the invention, at least one of the blocks in any of the block copolymers (7), (8), and (9)

is not a linear polymer. In some arrangements, at least one of the blocks in any of the block copolymers (7), (8), and (9) is a comb or branched polymer.

The embodiments of the invention are not limited to the examples shown in (2)-(9) above. There are a number of structural, high $T_s$ polymers that can be substituted for PXE above. There are also a number of conductive polymers that can be substituted for the PEO above. A generalized diblock structure can be shown as:

a generalized triblock structure can be shown as:

or a generalized (inverse) triblock structure can be shown as:

in which Ar can be any of:

Y can be any of ketones, sulfones, isopropylidene, hexafluoroisopropylidene, amides, oxygen, sulfur, nitrogen, and phosphonate. $R_1$, $R_2$, $R_3$, and $R_4$, is each chosen independently and can be any of hydrogen, alkyl, halogenated alkyl, alkene, aromatic rings, siloxane, alkyl ether, and alkyl thioether; $R_6$ can be any of alkyl, halogenated alkyl, alkene, aromatic rings, siloxane, alkyl ether, and alkyl thioether; n is an integer ranging from 1 to 10; a is an integer ranging from 10 to 90; b is an integer ranging from 10 to 90; c is an integer ranging from 10 to 90; and d is an integer ranging from 10 to 90. Although these generalized structures have been shown here as block copolymers, this is not the only possibility. The conductive molecules and structural molecules can also each be homopolymers as long as they can self-assemble into a microphase domain structure.

In some embodiments of the invention, the structural polymer has a softening temperature that is no less than 190° C. In some embodiments of the invention, the structural polymer has a softening temperature that is no less than 200° C. In some embodiments of the invention, the structural polymer has a softening temperature that is no less than 210° C. In some embodiments of the invention, the structural polymer has a softening temperature that is no less than 220° C.

In some embodiments of the invention, the structural phase can be made of polymers with high softening temperatures. In some embodiments of the invention, the structural phase can be made of poly(phenylene oxide). In some embodiments of the invention, the structural phase can be made of poly(2,6-dimethyl-1,4-phenylene oxide) (PXE). In some embodiments of the invention, the structural phase can be made of poly(phenylene sulfide). In some embodiments of the invention, the structural phase can be made of poly(phenylene sulfide sulfone). In some embodiments of the invention, the structural phase can be made of poly(phenylene sulfide ketone). In some embodiments of the invention, the structural phase can be made of poly(phenylene sulfide amide). In some embodiments of the invention, the structural phase can be made of polysulfone. In general, the softening temperatures of the microphase domain polymers disclosed herein are the same as the softening temperatures of their highest $T_s$ major component. The major components of the microphase domain polymers disclosed herein are the ionically-conductive polymer and structural polymer.

| Softening Temperatures for Some Exemplary High $T_s$ Polymers | |
|---|---|
| Polymer | $T_s$ (° C.) |
| poly(phenylene oxide) | 210 |
| poly(2,6-dimethyl-1,4-phenylene oxide) (PXE) | 210 |
| poly(phenylene sulfide) | 218 |
| poly(phenylene sulfide sulfone) | 217 |
| poly(phenylene sulfide ketone) | 218 |
| polysulfone | 185 |

In some embodiments of the invention, the conductive phase can be made of a linear or branched polymer. Conductive linear or branched polymers that can be used in the conductive phase include, but are not limited to, polyethers, polyamines, polyimides, polyamides, alkyl carbonates, polynitriles, and combinations thereof. The conductive linear or branched polymers can also be used in combination with polysiloxanes, polyphosphazines, polyolefins, and/or polydienes to form the conductive phase.

In another exemplary embodiment, the conductive phase is made of comb (or branched) polymers that have a backbone and pendant groups. Backbones that can be used in these polymers include, but are not limited to, polysiloxanes, polyphosphazines, polyethers, polydienes, polyolefins, polyacrylates, polymethacrylates, and combinations thereof. Pendants that can be used include, but are not limited to, oligoethers, substituted oligoethers, nitrile groups, sulfones, thiols, polyethers, polyamines, polyimides, polyamides, alkyl carbonates, polynitriles, other polar groups, and combinations thereof.

Figure 2A:
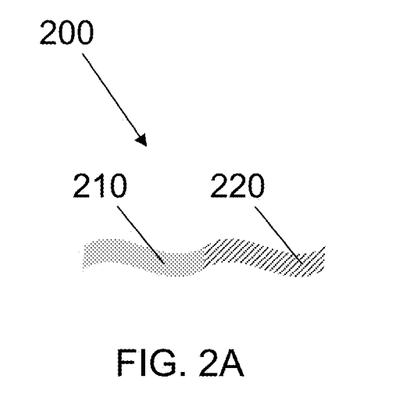
FIG. 2A is a simplified illustration of an exemplary diblock copolymer molecule.

FIG. 2A is a simplified illustration of an exemplary diblock polymer molecule 200 that has a first polymer block 210 and a second polymer block 220 covalently bonded together. In some arrangements both the first polymer block 210 and the second polymer block 220 are linear polymer blocks. In another arrangement, either one or both polymer blocks 210, 220 has a comb (or branched) structure. In some arrangements, neither polymer block is cross-linked. In another arrangement, one polymer block is cross-linked. In yet another arrangement, both polymer blocks are cross-linked.

Figure 2B:
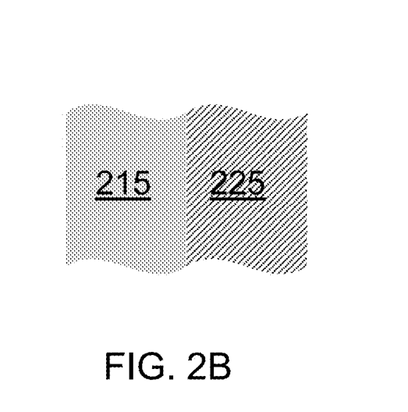
FIG. 2B is a schematic drawing that shows how multiple diblock copolymer molecules can arrange themselves to form a first domain of a first phase made of first polymer blocks and a second domain of a second phase made of second polymer blocks.
Figure 2C:
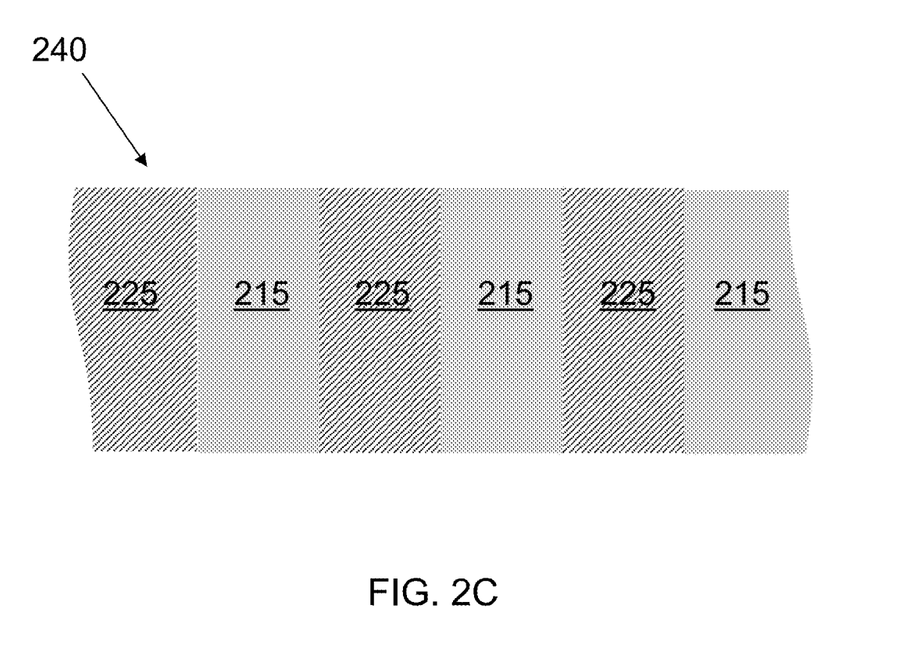
FIG. 2C is a schematic drawing that shows how diblock copolymer molecules can arrange themselves to form multiple repeat domains.

Multiple diblock polymer molecules 200 can arrange themselves to form a first domain 215 of a first phase made of the first polymer blocks 210 and a second domain 225 of a second phase made of the second polymer blocks 220, as shown in FIG. 2B. Diblock polymer molecules 200 can arrange themselves to form multiple repeat domains, thereby forming a continuous nanostructured block copolymer material 240, as shown in FIG. 2C. The sizes or widths of the domains can be adjusted by adjusting the molecular weights of each of the polymer blocks.

In another arrangement, the domains 215, 225 can be made by two different homopolymers (not shown) that form microphase-separated structures. The homopolymers may or may not be bonded together as block copolymers.

In some arrangements the first polymer domain 215 is ionically-conductive, and the second polymer domain 225 provides mechanical strength to the material.

Figure 3A:
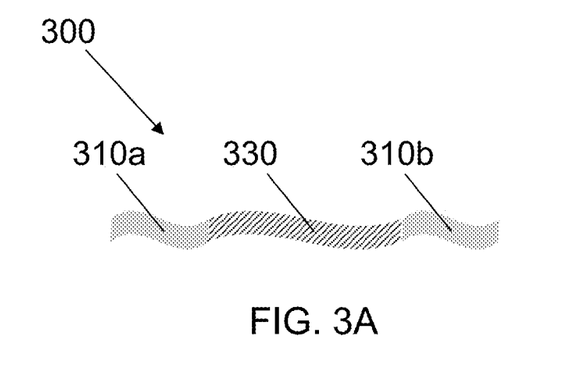
FIG. 3A is a simplified illustration of an exemplary triblock polymer molecule that has a first polymer block, a second polymer block, and a third polymer block that is the same as the first polymer block.

FIG. 3A is a simplified illustration of an exemplary triblock polymer molecule 300 that has a first polymer block 310a, a second polymer block 320, and a third polymer block 310b that is the same as the first polymer block 310a, all covalently bonded together. In some arrangements the first polymer block 310a, the second polymer block 320, and the third copolymer block 310b are linear polymer blocks. In another arrangement, either some or all polymer blocks 310a, 320, 310b have a comb (or branched) structure. In some arrangements, no polymer block is cross-linked. In another arrangement, one polymer block is cross-linked. In yet another arrangement, two polymer blocks are cross-linked. In yet another arrangement, all polymer blocks are cross-linked.

Figure 3B:
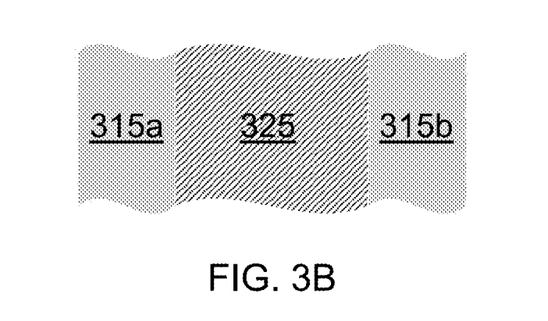
FIG. 3B is a schematic drawing that shows how multiple triblock polymer molecules can arrange themselves to form a first domain of a first phase, a second domain of a second phase, and a third domain of a first phase.
Figure 3C:
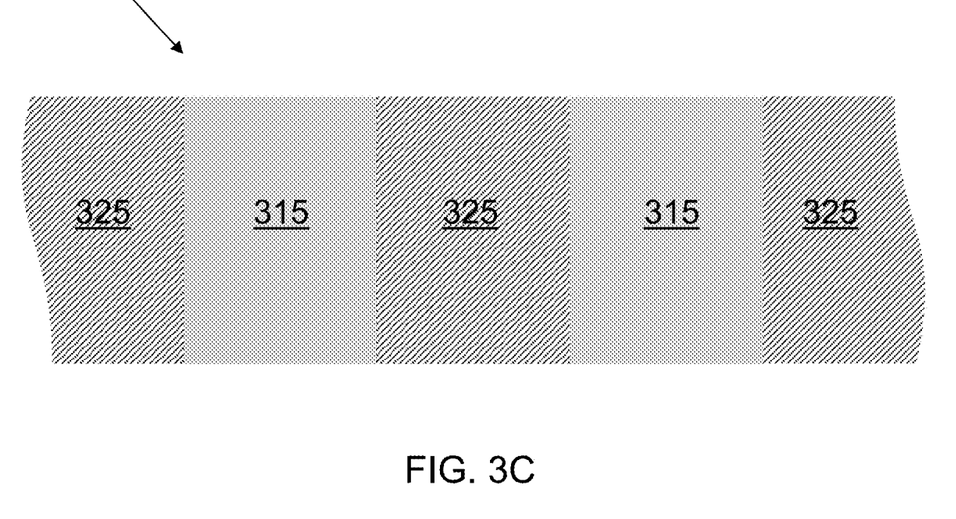
FIG. 3C is a schematic drawing that shows how triblock polymer molecules can arrange themselves to form multiple repeat domains, thereby forming a continuous nanostructured block copolymer.

Multiple triblock polymer molecules 300 can arrange themselves to form a first domain 315 of a first phase made of the first polymer blocks 310a, a second domain 325 of a second phase made of the second polymer blocks 320, and a third domain 315b of a first phase made of the third polymer blocks 310b as shown in FIG. 3B. Triblock polymer molecules 300 can arrange themselves to form multiple repeat domains 325, 315 (containing both 315a and 315b), thereby forming a continuous nanostructured block copolymer 330, as shown in FIG. 3C. The sizes of the domains can be adjusted by adjusting the molecular weights of each of the polymer blocks.

In another arrangement, the domains 315, 325 can be made by two different homopolymers (not shown) that form microphase-separated structures. The homopolymers may or may not be bonded together as block copolymers.

In some arrangements the first and third polymer domains 315a, 315b are ionically-conductive, and the second polymer domain 325 provides mechanical strength to the nanostructured block copolymer. In another arrangement, the second polymer domain 325 is ionically-conductive, and the first and third polymer domains 315 provide a structural framework.

Figure 4A:
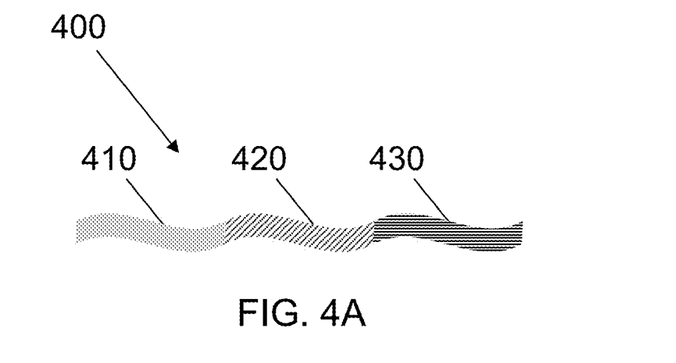
FIG. 4A is a simplified illustration of another exemplary triblock copolymer molecule that has a first polymer block, a second polymer block, and a third polymer block, different from either of the other two polymer blocks

FIG. 4A is a simplified illustration of another exemplary triblock polymer molecule 400 that has a first polymer block 410, a second polymer block 420, and a third polymer block 430, different from either of the other two polymer blocks, all covalently bonded together. In some arrangements the first polymer block 410, the second polymer block 420, and the third copolymer block 430 are linear polymer blocks. In another arrangement, either some or all polymer blocks 410, 420, 430 have a comb (or branched) structure. In some arrangements, no polymer block is cross-linked. In another arrangement, one polymer block is cross-linked. In yet another arrangement, two polymer blocks are cross-linked. In yet another arrangement, all polymer blocks are cross-linked.

Figures 4B, 4C:
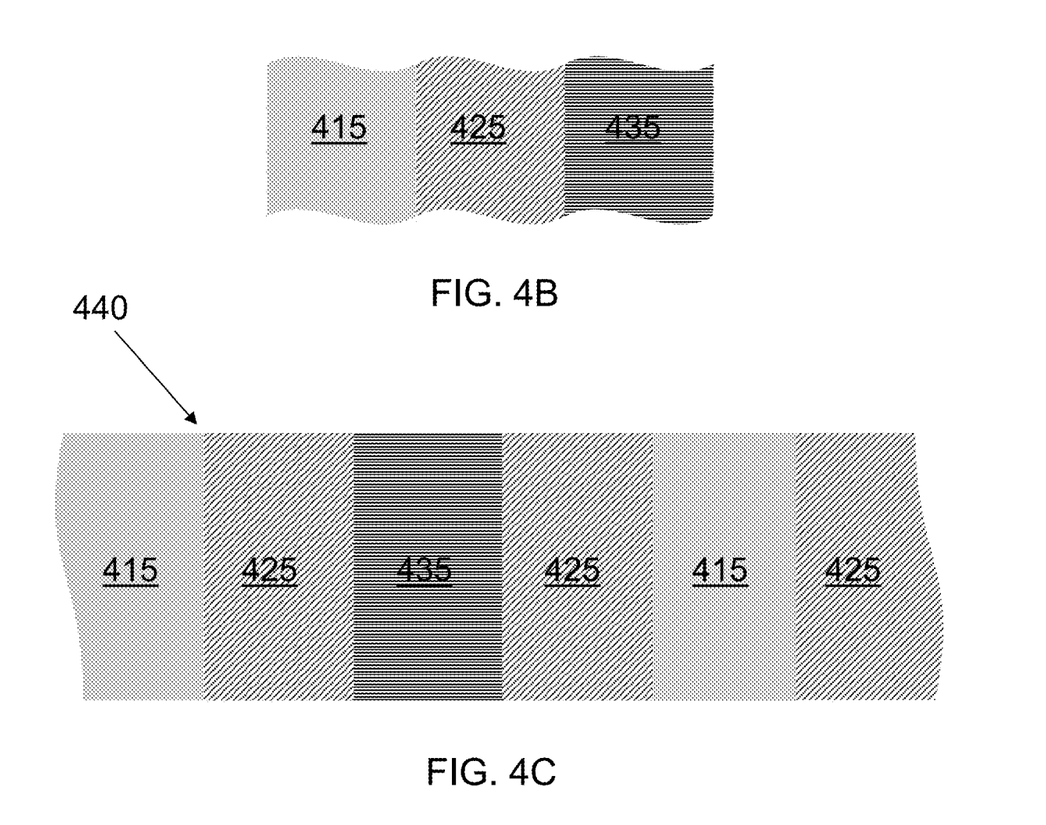
FIG. 4B is a schematic drawing that shown how multiple triblock copolymer molecules can arrange themselves to form a first domain of a first phase, a second domain of a second phase, and a third domain of a third phase.
FIG. 4C is a schematic drawing that shown how triblock polymer molecules can arrange themselves to form multiple repeat domains, thereby forming a continuous nanostructured block copolymer.

Multiple triblock polymer molecules 400 can arrange themselves to form a first domain 415 of a first phase made of the first polymer blocks 410a, a second domain 425 of a second phase made of the second polymer blocks 420, and a third domain 435 of a third phase made of the third polymer blocks 430 as shown in FIG. 4B. Triblock polymer molecules 400 can arrange themselves to form multiple repeat domains, thereby forming a continuous nanostructured block copolymer 440, as shown in FIG. 4C. The sizes of the domains can be adjusted by adjusting the molecular weights of each of the polymer blocks.

In some arrangements the first polymer domains 415 are ionically-conductive, and the second polymer domains 425 provide mechanical strength to the nanostructured block copolymer. The third polymer domains 435 provides additional functionality that may improve mechanical strength, ionic conductivity, chemical or electrochemical stability, may make the material easier to process, or may provide some other desirable property to the block copolymer. In other arrangements, the individual domains can exchange roles. In some arrangements, the third polymer domain 435 is ionically-conductive and different from the first ionically-conductive polymer block 415. In another arrangement, the third polymer domain 435 provides mechanical strength and is different from the second polymer domain 425.

In another arrangement, the domains 415, 425, 435 can be made by three different homopolymers (not shown) that form microphase-separated structures. The homopolymers may or may not be bonded together as block copolymers.

Choosing appropriate polymers for the block copolymers described above is important in order to achieve desired electrolyte properties. In some embodiments, the conductive polymer: (1) exhibits ionic conductivity of at least $10^{-5}$ $Scm^{-1}$ at electrochemical cell operating temperatures when combined with an appropriate salt(s), such as lithium salt(s); (2) is chemically stable against such salt(s); and (3) is thermally stable at electrochemical cell operating temperatures. In some embodiments, the structural material has a modulus in excess of $1 \times 10^5$ Pa at electrochemical cell operating temperatures. In some embodiments, the third polymer: (1) is rubbery and (2) has a glass transition temperature lower than operating and processing temperatures. In some embodiments, the third polymer: (1) exhibits ionic conductivity of at least $10^{-5}$ $Scm^{-1}$ at electrochemical cell operating temperatures when combined with an appropriate salt(s), such as lithium salt(s); (2) is chemically stable against such salt(s); and (3) is thermally stable at electrochemical cell operating temperatures. It is useful if all materials are mutually immiscible.

In some embodiments of the invention, the conductive phase can be made of a linear or branched polymer. Conductive linear or branched polymers that can be used in the conductive phase include, but are not limited to, polyethers, polyamines, polyimides, polyamides, alkyl carbonates, polynitriles, and combinations thereof. The conductive linear or branched polymers can also be used in combination with polysiloxanes, polyphosphazines, polyolefins, and/or polydienes to form the conductive phase.

In another exemplary embodiment, the conductive phase is made of comb (or branched) polymers that have a backbone and pendant groups. Backbones that can be used in these polymers include, but are not limited to, polysiloxanes, polyphosphazines, polyethers, polydienes, polyolefins, polyacrylates, polymethacrylates, and combinations thereof. Pendants that can be used include, but are not limited to, oligoethers, substituted oligoethers, nitrile groups, sulfones, thiols, polyethers, polyamines, polyimides, polyamides, alkyl carbonates, polynitriles, other polar groups, and combinations thereof.

There are no particular restrictions on the electrolyte salt that can be used in the block copolymer electrolytes. Any electrolyte salt that includes the ion identified as the most desirable charge carrier for the application can be used. It is especially useful to use electrolyte salts that have a large dissociation constant within the polymer electrolyte.

Suitable examples include alkali metal salts, such as Li salts. Examples of useful Li salts include, but are not limited to, $LiPF_6$, $LiN(FSO_2)_2$, $LiN(CF_3SO_2)_2$, $Li(CF_3SO_2)_3C$, $LiN(SO_2CF_2CF_3)_2$, $LiB(C_2O_4)_2$, $B_{12}F_xH_{12-x}$, $B_{12}F_{12}$, and mixtures thereof.

In some embodiments of the invention, single ion conductors can be used with electrolyte salts or instead of electrolyte salts. Examples of single ion conductors include, but are not limited to sulfonamide salts, boron based salts, and sulfates groups.

In some embodiments of the invention, the structural phase can be made of polymers with high softening temperatures such as poly(phenylene oxide), poly(2,6-dimethyl-1,4-phenylene oxide) (PXE), poly(phenylene sulfide), poly (phenylene sulfide sulfone), poly(phenylene sulfide ketone), poly(phenylene sulfide amide), and polysulfone.

Additional species can be added to nanostructured block copolymer electrolytes to enhance the ionic conductivity, to enhance the mechanical properties, or to enhance any other properties that may be desirable.

The ionic conductivity of nanostructured block copolymer electrolyte materials can be improved by including one or more additives in the ionically-conductive phase. An additive can improve ionic conductivity by lowering the degree of crystallinity, lowering the melting temperature, lowering the glass transition temperature, increasing chain mobility, or any combination of these. A high dielectric additive can aid dissociation of the salt, increasing the number of Li+ ions available for ion transport, and reducing the bulky Li+ [salt] complexes. Additives that weaken the interaction between Li+ and PEO chains/anions, thereby making it easier for Li+ ions to diffuse, may be included in the conductive phase. The additives that enhance ionic conductivity can be broadly classified in the following categories: low molecular weight conductive polymers, ceramic particles, room temp ionic liquids (RTILs), high dielectric organic plasticizers, and Lewis acids.

Other additives can be used in the polymer electrolytes described herein. For example, additives that help with overcharge protection, provide stable SEI (solid electrolyte interface) layers, and/or improve electrochemical stability can be used. Such additives are well known to people with ordinary skill in the art. Additives that make the polymers easier to process, such as plasticizers, can also be used.

In some embodiments of the invention, high $T_s$ block copolymers are synthesized using a metal-free initiation reaction. The reaction uses a strong metal-free base such as the phospazene base (t-BuP$_4$) instead of an alkali metal or metal base to activate the OH ends of the high $T_s$ structural polymer. Activation of the OH ends of the high $T_s$ structural polymer is necessary so that the conductive molecules can be attached or grown to form the block copolymer. This method has not been used heretofore for block copolymer syntheses. The metal-free method offers significant advantages for synthesis of block copolymers as no homopolymer of the second block will be present. The metal-free strong base is neutral and any excess metal-free base will not initiate anionic polymerization as would occur with a metal base. Thus, it offers more pure products with fewer purification steps. This is especially significant for large-scale manufacturing of block copolymers. Another important advantage offered by the metal-free method is for the synthesis of block copolymers that are intended for use as electrolytes in electrochemical cells. Even with the best purification protocols, there are still trace amounts of metals left behind in block copolymers synthesized using metal catalysts or initiators. Metals in the electrolyte can interfere with the electrochemical functioning of the cell, leading to shorting and/or premature failure. Metal-free synthesis methods eliminate this risk.

Cell Designs that Include Polyester-Based Polymers

Figure 5:
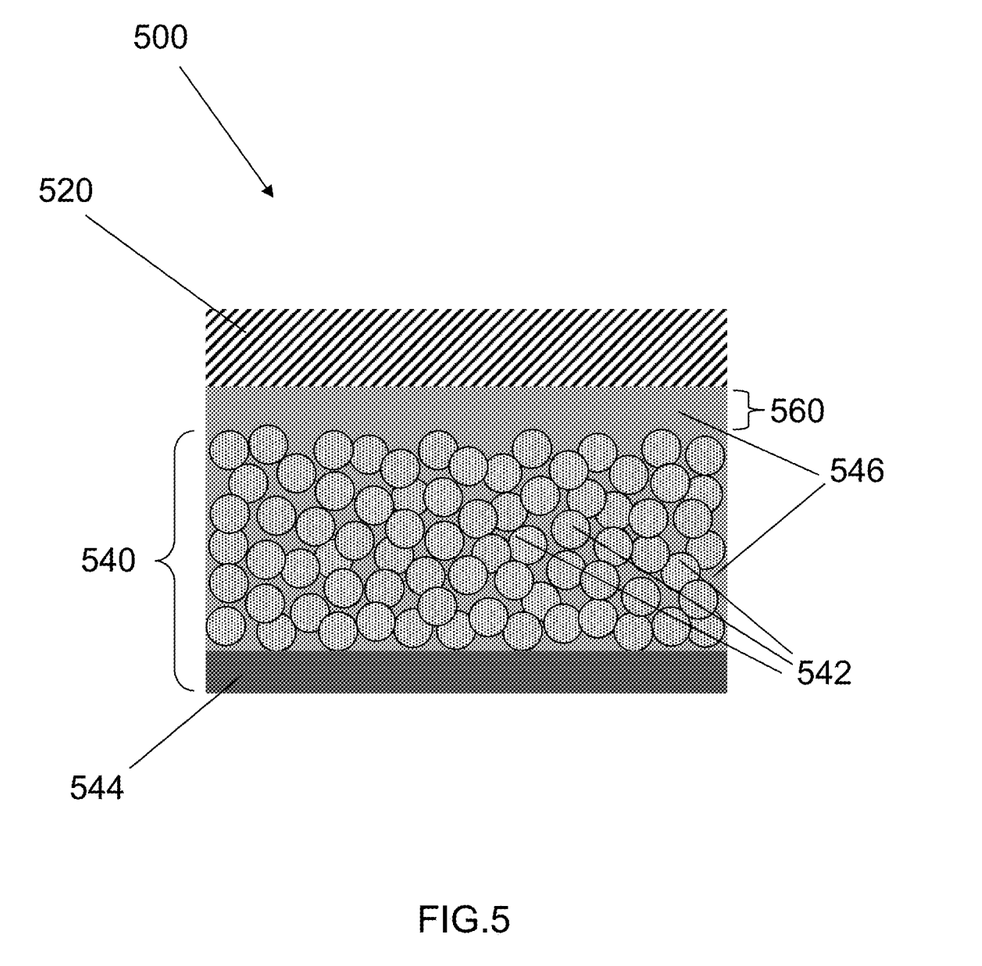
FIG. 5 is a schematic illustration of one configuration of a lithium battery cell that contains an electrolyte that is used in both the cathode and the separator, according to an embodiment of the invention.

In one embodiment of the invention, a lithium battery cell 500 has an anode 520 that is configured to absorb and release lithium ions, as shown in FIG. 5. The anode 520 may be a lithium or lithium alloy foil or it may be made of a material into which lithium ions can be absorbed such as graphite or silicon. Other choices for the anode 520 include, but are not limited to, lithium titanate, and lithium-silicon alloys. The lithium battery cell 500 also has a cathode 540 that includes cathode active material particles 542, an electronically-conductive additive such as carbon black (not shown), a current collector 544, a catholyte (electrolyte in the cathode) 546, and an optional binder (not shown). There is a separator region 560 between the anode 520 and the cathode 540. The catholyte 546 extends through the separator region 560 and up to the anode 520 and facilitates movement of lithium ions back and forth between the anode 520 and the cathode 540 as the cell 500 cycles. The electrolyte 546 in the separator region 560 and the catholyte 546 in the cathode 540 are the same. In one arrangement, the electrolyte 546 includes any of the polyester-based polymer electrolytes disclosed above.

Figure 6:
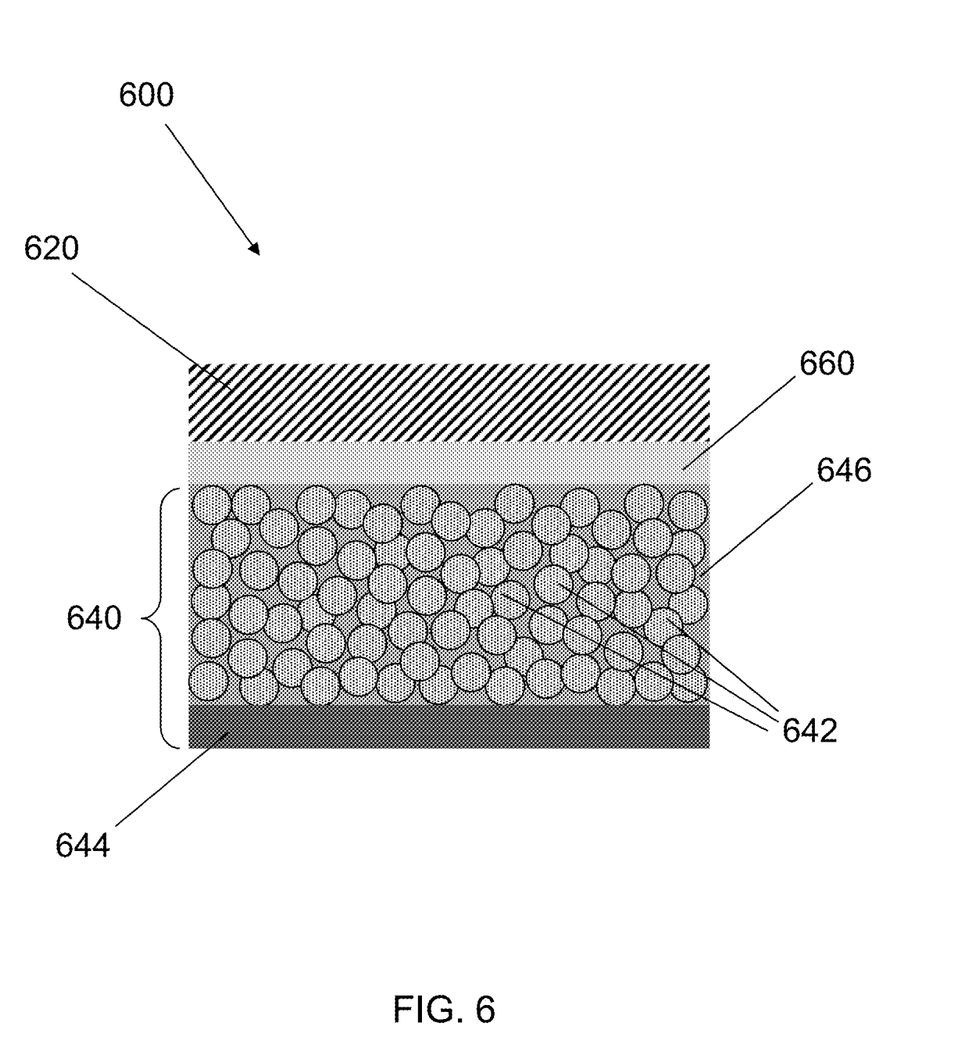
FIG. 6 is a schematic illustration of another configuration of a lithium battery cell that contains a catholyte and a separator electrolyte different from the catholyte, according to an embodiment of the invention.

In another embodiment of the invention, a lithium battery cell 600 has an anode 620 that is configured to absorb and release lithium ions as shown in FIG. 6. The anode 620 may be a lithium or lithium alloy foil or it may be made of a material into which lithium ions can be absorbed such as graphite or silicon. Other choices for the anode 620 include, but are not limited to, lithium titanate, and lithium-silicon alloys. The lithium battery cell 600 also has a cathode 640 that includes cathode active material particles 642, an electronically-conductive additive such as carbon black (not shown), a current collector 644, a catholyte 646, and an optional binder (not shown). In some arrangements, the catholyte 646 includes any electrolyte suitable for use in the cathode of a lithium-based battery cell. There is a separator electrolyte 660 between the anode 620 and the cathode 640. The separator electrolyte 660 facilitates movement of lithium ions back and forth between the anode 620 and the cathode 640 as the cell 600 cycles. The separator electrolyte 660 may include any electrolyte that is suitable for use in a lithium battery cell. In some arrangements, the separator electrolyte 660 contains any of the polyester-based electrolytes disclosed herein. In some arrangements, the separator electrolyte 660 contains mixtures or combinations of other solid polymer electrolytes with any of the polyester-based polymer electrolytes disclosed herein. Examples of electrolytes suitable for use as catholytes 646, include, but are not limited to, a liquid electrolyte, a viscous liquid or gel electrolyte, and a solid polymer electrolyte with which separator electrolyte 660 is immiscible.

A solid polymer electrolyte for use in the cathode 540, 640 can be any electrolyte that is appropriate for use in the cathode of a Li battery cell. Of course, such electrolytes usually include electrolyte salt(s) that help to provide ionic conductivity. Examples of such electrolytes include, but are not limited to, block copolymers that contain ionically-conductive blocks and structural blocks that make up ionically-conductive phases and structural phases, respectively. The ionically-conductive phase may contain one or more linear polymers such as polyethers, polyamines, polyimides, polyamides, poly alkyl carbonates, polynitriles, perfluoro polyethers, fluorocarbon polymers substituted with high dielectric constant groups such as nitriles, carbonates, and sulfones, and combinations thereof. In one arrangement, the ionically-conductive phase contains one or more polyester-based polymers, as disclosed herein. The linear polymers can also be used in combination as graft copolymers with polysiloxanes, polyalkoxysiloxanes, polyphosphazines, polyolefins, and/or polydienes to form the conductive phase. The structural phase can be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide), poly(phenylene sulfide), poly(phenylene sulfide sulfone), poly(phenylene sulfide ketone), poly(phenylene sulfide amide), polysulfone, fluorocarbons, such as polyvinylidene fluoride, or copolymers that contain styrene, methacrylate, or vinylpyridine. It is especially useful if the structural phase is rigid and is in a glassy or crystalline state.

With respect to the embodiments described in FIGS. 5 and 6, suitable cathode active materials include, but are not limited to, LFP (lithium iron phosphate), LMP (lithium metal phosphate in which the metal can be Mn, Co, or Ni), $V_2O_5$ (divanadium pentoxide), NCA (lithium nickel cobalt aluminum oxide), NCM (lithium nickel cobalt manganese oxide), high energy NCM (HE-NCM—magnesium-rich lithium nickel cobalt manganese oxide), lithium manganese spinel, lithium nickel manganese spinel, and combinations thereof. Suitable electronically-conductive additives include, but are not limited to, carbon black, graphite, vapor-grown carbon fiber, graphene, carbon nanotubes, and combinations thereof. A binder can be used to hold together the cathode active material particles and the electronically conductive additive. Suitable binders include, but are not limited to, PVDF (polyvinylidene difluoride), PVDF-HFP poly(vinylidene fluoride-co-hexafluoropropylene), PAN (polyacrylonitrile), PAA (polyacrylic acid), PEO (polyethylene oxide), CMC (carboxymethyl cellulose), SBR (styrene-butadiene rubber), PBA (polybutylacrylate), and combinations thereof.

Any of the polymers described herein may be liquid or solid, depending on its molecular weight. Any of the polymers described herein may be in a crosslinked or an uncrosslinked state. Any of the polymers described herein may be crystalline or glassy. Any of the polymers described herein may be copolymerized with other polymers to form copolymers, block copolymers, or graft copolymers. Copolymerization may also affect the mechanical properties of some polymers allowing them to become solid polymer electrolytes. Any of the polymers described herein can be combined with an electrolyte salt to be used as a solid polymer electrolyte. Any of these solid polymer electrolytes may be used as separator, catholyte, anolyte, or any combination thereof in a battery cell.

EXAMPLES

The following examples provide details relating to composition, fabrication and performance characteristics of polymers in accordance with the present invention. It should be understood the following is representative only, and that the invention is not limited by the detail set forth in these examples.

Example 1

A metal-free initiation reaction was used to synthesize PXE-PEO. PXE (Sigma-Aldrich, Mw~50K) (2 g) was dissolved in 60 ml dried THF. Then, in a glove-box, 0.15 ml of 0.5M t-BuP$_4$ benzene solution (t-BuP$_4$ from Sigma-Aldrich) was added to the solution. The mixture was stirred at 50° C. for 24 hrs under an inert atmosphere. Ethyleneoxide (EO) (6 ml) was transferred into the mixture via a high vacuum line. The mixture was stirred at 45° C. for 48 hrs. After cooling down to 25° C., the mixture was precipitated in hexane, filtered under vacuum, and washed with isopropanol. After further vacuum drying, the yield was 5.2 g of white solid. Proton NMR (in D-benzene) showed 68 wt % PEO and 32 wt % PXE.

Example 2

PXE (Sigma-Aldrich, Mw~50K) (2 g) was dissolved in 60 ml dried THF. In a glove-box, 0.5M DPMK (diphenylmethylene potassium) THF solution (0.15 ml) was added to the solution. The mixture was stirred at 50° C. for 24 hrs under an inert atmosphere. Ethyleneoxide (EO) (6 ml) was transferred into the mixture via a high vacuum line. The mixture was stirred at 45° C. for 48 hrs. After cooling down to 25° C., the mixture was precipitated in hexane, filtered under vacuum, and washed with isopropanol. After further vacuum drying, the yield was 5.5 g of white solid. Proton NMR (in D-benzene) showed 70 wt % PEO and 30 wt % PXE.

Example 3

PXE (Sigma-Aldrich, Mw~50K) (2 g) was dissolved in 60 ml dried THF. In a glove-box, 0.15 ml of 0.5M t-BuP$_4$ benzene solution (t-BuP$_4$ from Sigma-Aldrich) was added to the solution. The mixture was stirred at 50° C. for 24 hrs under an inert atmosphere. Then 5.0 ml allyl glycidyl ether (AGE) was added to the mixture. The mixture was stirred at 45° C. for 48 hrs. After cooling down to 25° C., the mixture was precipitated in hexane, filtered under vacuum, and washed with isopropanol. After further vacuum drying, the yield was 2.4 g of white solid PXE-b-PAGE. Proton NMR (in D-benzene) showed 23 wt % PAGE (polyallyl glycidyl ether) and 77 wt % PXE PXE-b-PAGE (1.0 g) was dissolved in 12 ml toluene, and 100 ul Pt catalyst (Platinum(0)-1,3-divinyl-1,1,3,3-tetramethyldisiloxane complex solution in xylene, Pt~2 wt % from Aldrich) and 1.16 g HSi(CH$_3$)$_2$OSi(CH$_3$)$_2$C$_3$H$_6$O(C$_2$H$_4$O)$_3$CH$_3$ were added to the solution. The mixture was stirred at 65° C. for 18 hrs. The solution was then diluted with an additional 24 ml of toluene. Silica gel (0.5 g) was added to the mixture, and it was stirred at 25° C. for 4 hrs. The solution was filtered to remove the silica gel, precipitated in hexane, and vacuum dried. Polymer in the amount of 1.0 g was obtained, and proton NMR showed 63.8 wt % PXE and 36.2 wt % grafted PAGE. The reaction sequence is shown in (4) below.

(4)

Example 4

PXE (Sigma-Aldrich, Mw~50K) (2 g) was dissolved in 60 ml dried THF. Then 0.3 ml of 0.5M t-BuP$_4$ benzene solution (t-BuP$_4$ from Sigma-Aldrich) was added to the solution in a glove-box. The mixture was stirred at 50° C. for 24 hrs under an inert atmosphere. Then 4 ml ethyleneoxide (EO) was transferred into the mixture via a high vacuum line. The mixture was stirred at 45° C. for 48 hrs. After cooling down to 25° C., 0.72 ml (0.063M of 1,4-dibromoxylene in benzene solution) was added into the mixture in a glove-box. The mixture was stirred at 50° C. overnight. After cooling down to 25° C., the mixture was precipitated in hexane, filtered under vacuum, and washed with isopropanol. After further vacuum drying, the yield was 5.4 g of white solid triblock copolymer. Proton NMR (in D-benzene) showed 64 wt % PEO and 35 wt % PXE.
The reaction sequence is shown in (5) below.

(5)

-continued

Example 5

PXE (poly(2,6-dimethyl, 1.4-phenylene oxide)) (3.9 g, Mw=20K) was dissolved in anhydrous toluene in 100 ml flask. Under argon, tin(II) 2-ethylhexanoate (0.48 g) and ε-caprolactone (4.4 g) were added into the solution. The solution was heated to 120° C. under argon for 5 days and then cooled to room temperature. The solution was precipitated into MeOH, and then centrifuged to collect the solid precipitate. The precipitate was dried under vacuum to obtain the crude product. The crude product was washed in 10× ethyl acetate 3 times to remove polycaprolactone homopolymer and yield the block copolymer. Proton NMR (in CDCl3) showed 59 wt % PXE. The reaction sequence is shown in (z) below.

(z)

LiTFSI was added to the polymer shown in (z), and conductivity measurements were made. The conductivity of this polymer at 80° C. is 1×10−4 S/cm, and the elastic modulus at 80° C. is 200 MPa.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A block copolymer electrolyte for use in an electrochemical cell, comprising:

a block copolymer having the following structure:

wherein Ar is selected from the group consisting of:

wherein:
Y is selected from the group consisting of ketones, sulfones, isopropylidene, hexafluoroisopropylidene, amides, oxygen, sulfur, nitrogen, and phosphonate;
$R_1$, $R_2$, $R_3$, and $R_4$ is each selected independently from the group consisting of hydrogen, alkyl, halogenated alkyl, alkene, aromatic rings, siloxane, alkyl ether, and alkyl thioether;
$R_6$ is selected from the group consisting of alkyl, halogenated alkyl, alkene, aromatic rings, siloxane, alkyl ether, and alkyl thioether;
a is an integer ranging from 10 to 90;
b is an integer ranging from 10 to 90; and
c is an integer ranging from 10 to 90 and an electrolyte salt.

2. A block copolymer electrolyte for use in an electrochemical cell, comprising:

a block copolymer having the following structure:

wherein Ar is selected from the group consisting of:

wherein:
Y is selected from the group consisting of ketones, sulfones, isopropylidene, hexafluoroisopropylidene, amides, oxygen, sulfur, nitrogen, and phosphonate;
$R_1$, $R_2$, $R_3$, and $R_4$ is each selected independently from the group consisting of hydrogen, alkyl, halogenated alkyl, alkene, aromatic rings, siloxane, alkyl ether, and alkyl thioether;
$R_6$ is selected from the group consisting of alkyl, halogenated alkyl, alkene, aromatic rings, siloxane, alkyl ether, and alkyl thioether;
a is an integer ranging from 10 to 90;
b is an integer ranging from 10 to 90; and
d is an integer ranging from 10 to 90 and an electrolyte salt.

3. An electrochemical cell, comprising:
an anode configured to absorb and release lithium ions;
a cathode comprising cathode active material particles, an electronically-conductive additive, and a catholyte;
a current collector adjacent to an outside surface of the cathode; and
a separator region between the anode and the cathode, the separator region comprising a separator electrolyte configured to facilitate movement of lithium ions back and forth between the anode and the cathode;
wherein the separator electrolyte comprises an electrolyte selected from the group consisting of the polymer electrolyte of claim 1, and the polymer electrolyte of claim 2.

4. The electrochemical cell of claim 3 wherein the catholyte comprises a solid polymer electrolyte.

5. The electrochemical cell of claim 3 wherein the catholyte is immiscible with the separator electrolyte.

6. The electrochemical cell of claim 3 wherein the catholyte and the separator electrolyte are the same.

7. The electrochemical cell of claim 3 wherein the anode comprises a material selected from the group consisting of lithium metal, lithium alloy, lithium titanate, graphite and silicon.

8. The electrochemical cell of claim 3 wherein the cathode active material is selected from the group consisting of lithium iron phosphate, lithium metal phosphate, divanadium pentoxide, lithium nickel cobalt aluminum oxide, lithium nickel cobalt manganese oxide, magnesium-rich lithium nickel cobalt manganese oxide, lithium manganese spinel, lithium nickel manganese spinel, and combinations thereof.

9. The electrochemical cell of claim 3 wherein the separator electrolyte further comprises ceramic electrolyte particles.

10. The electrochemical cell of claim 3 wherein the separator electrolyte is crosslinked.

* * * * *